United States Patent

[11] 3,604,668

| | | | |
|---|---|---|---|
| [72] | Inventor | Karl Bernhardt | |
| | | 628 Euclid St., Santa Monica, Calif. 90402 | |
| [21] | Appl. No. | 832,593 | |
| [22] | Filed | June 12, 1969 | |
| [45] | Patented | Sept. 14, 1971 | |

[54] CLAMPING MECHANISM FOR ASSISTING IN MEASURING MACHINE QUILL TRAVEL
10 Claims, 5 Drawing Figs.

[52] U.S. Cl. .................................................... 248/223,
 248/229, 33/185
[51] Int. Cl. ..................................................... B23q 11/00
[50] Field of Search............................................33/185, 172
 A; 77/55 CE; 269/47–53 CE, 101, 249, 76, 78;
 279/83, 86; 248/27, 121, 223, 226 R, 226 A, 226
 B, 229; 24/243 B

[56] References Cited
UNITED STATES PATENTS

| 1,486,158 | 3/1924 | Price | 248/229 X |
|---|---|---|---|
| 2,316,073 | 4/1943 | Kellogg | 248/226 A |
| 2,333,671 | 11/1943 | Peters et al. | 248/226 B |
| 2,365,935 | 12/1944 | Boggs | 248/229 |
| 2,735,519 | 2/1956 | Frischmann | 248/226 |
| 3,136,518 | 6/1964 | Hall et al. | 248/226 |

*Primary Examiner*—William H. Schultz
*Attorney*—Elliott & Pastoriza

ABSTRACT: A clamping mechanism has a block formed with a lug and a pair of parallel arms spaced upon opposite sides of the lug. Extending obliquely across the longitudinal centerline of the lug is a locking pin that is coaxially aligned with a force-transmittting screw coupled to the block. The screw has an inner end engaged against the locking pin and an outer end positioned at a convenient location so that a machinist or the like may easily reach the screw in order to drive the pin to its locking position. To tightly clamp the clamping mechanism against a curved body formed with a bore, the lug is positioned within the bore with at least one arm held aligned against the body periphery. The locking pin is driven against a bore wall location and at least one abutment shoulder formed by the lug is simultaneously driven against another bore wall location.

INVENTOR:
KARL BERNHARDT

BY Elliott & Pastoriza
ATTORNEYS

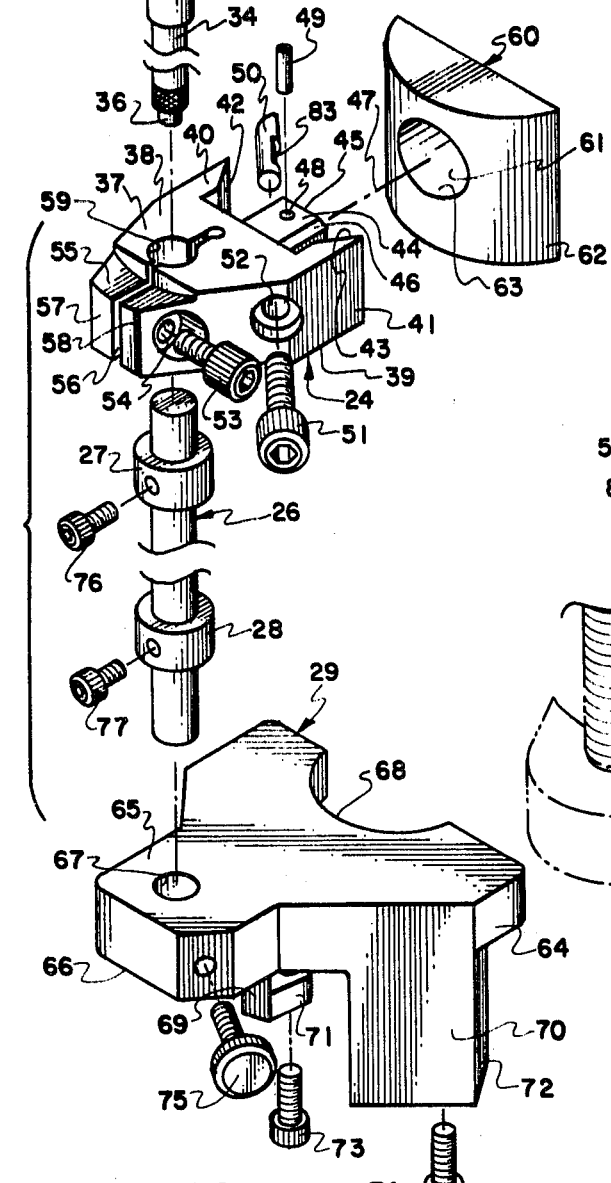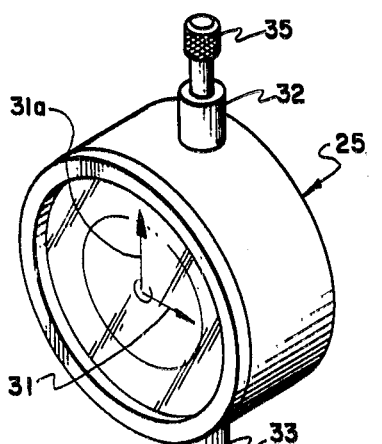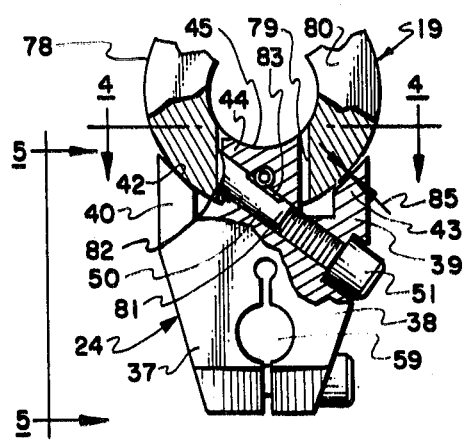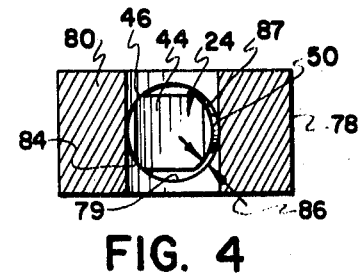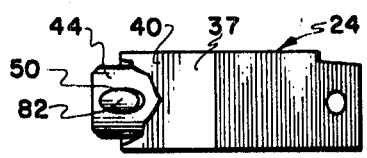

CLAMPING MECHANISM FOR ASSISTING IN MEASURING MACHINE QUILL TRAVEL

BACKGROUND OF THE INVENTION

The present invention relates to clamping mechanisms and more specifically to a clamping mechanism constructed to; (1) effect a clamping force against the interior wall of a bore formed through a curved body so that the clamping mechanism and body can be held tightly together, and, (2) occupy a relatively small space.

Conventional clamping mechanisms constructed to be clamped within bores of various components accomplish clamping by either threaded interengagement or by expansion couplings. These clamping mechanisms usually occupy most of the space surrounding the centerline of the bore.

In accordance with this invention a clamping mechanism can be quickly clamped within and detached from the bore formed in a component or body such as a quill stop ring. The particular manner in which the clamping mechanism can be used in conjunction with a quill stop ring to assist in measuring quill travel will be fully described as the description of the invention proceeds.

BRIEF SUMMARY OF THE INVENTION

Briefly described, the present invention in its broadest scope concerns a clamping mechanism capable of being easily assembled in the cavity or bore of a body and quickly detached from the bore. The body may be any type of stationary or moveable component such as a quill stop ring whose movement along the longitudinal axis of a machine will assembly is ordinarily used to measure the cutting length depth or penetration of milling tools or cutting tools.

The clamping mechanism includes a block coupled to a lug having a longitudinal centerline. The lug is formed on one side with one or more abutment shoulders. Extending obliquely across the lug longitudinal centerline is a locking pin with an inner end and an outer end. Force-transmitting means in the form of a screw, which is coupled to the block, is coaxially aligned with the locking pin and functions to urge the locking pin from a retracted position to an extended position partially outside of the lug. The pin extends from a side of the lug opposite the side on which the abutment shoulders are formed.

A pair of spaced arms coupled to the block and positioned on opposite sides of the lug terminate in free ends that operate to assist in aligning the block.

The clamping mechanism interfits and clamps to a body having a curved exterior periphery and an interior wall defining a bore that extends generally normally to the curved exterior periphery. To accomplish clamping action the lug is projected into the bore and as the machinist holds both the arm free ends against the curved exterior periphery of the body he torques or otherwise causes the force-transmitting means to urge the locking pin outer and against the bore wall. As the locking pin is pressed against the bore wall at one location the one or more abutment shoulders are forced to engage the bore wall at one or more other locations in order to effect a stable multiple-point clamping engagement with the body.

The above-mentioned body with a curved exterior periphery may be a quill stop ring fixed to a conventional quill unit which in turn, as is customary, rotatably mounts a spindle. The block, in this situation, is formed with a first retaining opening for firmly holding a dial indicator. Positioned beneath and aligned with the block is a base support which is coupled to a lower portion of the quill housing and is formed with a second retaining opening. An elongated measuring rod carrying one or more stop rings can be held within the second retaining opening.

When the dial indicator is arranged to engage the top portion of the measuring rod and the quill unit is moved longitudinally towards the base support the machinist can easily and accurately measure the quill travel and hence cutting depth or penetration of the cutting tool.

BRIEF DESCRIPTION OF THE DRAWINGS

The numerous benefits and unique aspects of the present invention will fully understood when the following detailed description is studied in conjunction with the drawings in which:

FIG. 2 is an exploded view, showing the structural relationship between the clamping mechanism and other components that can be arranged to measure the amount of quill travel;

FIG. 3 is a detailed, partially sectional view, showing the clamping mechanism clamped within the bore of a curved body with one arm aligned against the external curved periphery of the body;

FIG. 4 is a sectional view taken along line 4—4 of FIG. 3, showing the locking pin and a pair of abutment shoulders locked at three different locations to the bore wall; and, FIG. 5 is a detailed partially sectional view taken along line 5—5 with the curved body removed for clarity, showing the locking pin projecting outwardly of the clamping mechanism.

DETAILED DESCRIPTION OF THE PREFERRED EMBODIMENT

Figure 1:
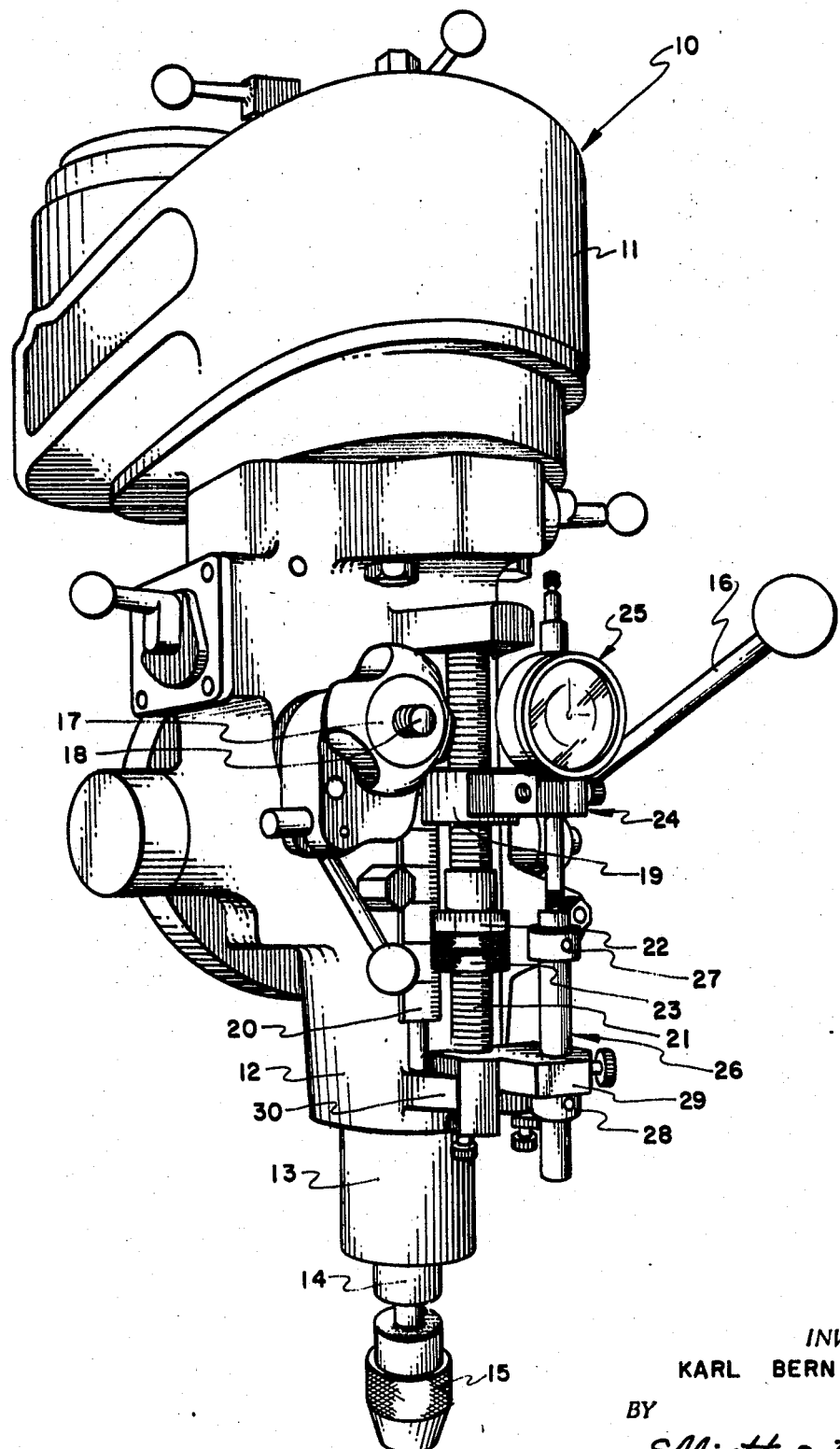
FIG. 1 is a perspective view, showing the clamping mechanism of this invention assembled to a conventional Bridgeport milling machine with a dial indicator positioned in the clamping mechanism.

Referring now to FIG. 1, a conventional milling machine is shown that may be a well-known Bridgeport machine that is commercially available and manufactured by Bridgeport Machines, Inc., of Bridgeport, Conn. Machine 10 has a belt housing 11 and a quill housing 12 positioned beneath belt housing 11. Quill housing 12 journals and centrally mounts a quill unit 13 for vertical movement along its longitudinal axis. Quill unit 13 rotatably mounts a spindle 14 which simultaneously moves with the quill unit 13. Spindle 14 mounts a conventional chuck 15 which, when machine 10 is operating, would hold a drill, milling tool or other common type of cutting tool in the customary manner. A horizontally and vertically adjustable worktable (not shown) for holding and stabilizing a workpiece would underlie chuck 15.

Machine 10 has the customary quill feed handle 16 and a manual quill feed knob 17, either of which may be manipulated to move quill unit 13 in a desired vertical direction. A reversing button 18 controls the vertical feed direction.

A quill stop ring 19 is fixed to quill unit 13 through a vertically extending and elongated slot formed in a sidewall portion of quill housing 12. Quill stop ring 19 moves simultaneously up and down with quill unit 13 and spindle 14. Quill stop ring 19 has both a radially outwardly extending bore and a radially inwardly extending bore, which bores register with one another and are used by a machinist in assembling machine 10. The bores admit a bolt which functions to firmly lock quill stop ring 19 against quill unit 13. The movement of quill stop ring 19 can be easily sensed and measured to thereby accurately measure the amount of vertical travel by quill unit 13 whose motion, in turn, is identical with the amount of penetration or retraction by a cutting tool. Quill housing 12 carries a vertically oriented scale 20 which coacts with a vertically aligned micrometer screw 21 and micrometer adjustment nut 22 to set or fix cutting tool depths. Micrometer screw 21 extends through the center of ring 19 and does not engage ring 19. A locknut 23 interengaged with micrometer screw 21 serves to stabilize selected set positions of micrometer adjustment nut 22.

The important advantages of the present invention will be better understood following a description of the existing practice by which a machinist sets cutting tools depths. Many workpieces must be cut or milled to widely varying depths and machinists have heretofore been unable to avoid the necessity of frequently resetting the micrometer nut 22. When the required cutting depths change drastically the machinist must manually twist the micrometer nut 22 from virtually one end of micrometer screw 21 to the other. Since the increment of longitudinal travel along micrometer screw 21 for each complete rotation micrometer nut 22 is very small the machinist's efforts become time consuming and tedious which condition tends to increase the likelihood of inaccurate settings. One use of the present invention is aimed at overcoming this particular problem.

A clamping mechanism 24 is locked within the radially outwardly extending bore (shown and described in connection with FIG. 3) of quill stop ring 19. Clamping mechanism 24 is also accurately aligned against the external periphery of quill stop ring 19 in a manner that will be fully described. A dial indicator 25 is shown retained by clamping mechanism 24 and in engagement with the top end of an elongated measuring rod 26. Predetermined heights are set by adjustable stop rings 27 and 28 that are positioned on opposing sides of a base support 29. Base support 29 adjustably retains measuring rod 26 and is firmly coupled to a lower portion rib or boss 30 that is integrally formed by quill housing 12.

Referring to FIG. 2, an exploded view of clamping mechanism 24 is depicted in conjunction with other components. A standard commercially available dial indicator 25, preferably shockproof, has the customary inner arrow or dial 31 for reading movements in one-tenth inch segments, and, an outer arrow or dial 31a geared to sweep through one complete revolution as inner dial 31 travels through a one-tenth inch segment. Dial indicator 25 has a stem with an upper collar 32 and a lower collar 33. Extending centrally through dial indicator 25, upper collar 32 and lower collar 33 is a probe or spindle 34 that has a top section 35 and a bottom section 36. The capacity of dial indicator 25 or total travel range of spindle 34 may be 1 or 2 inches as is most common.

Referring primarily to FIG. 2 clamping mechanism 24 is constituted by a metal block 37 formed with flat and mutually parallel top surface 38 and bottom surface 39. Extending outwardly from block 37 is a pair of spaced and generally parallel arms 40 and 41 that terminate in free ends 42 and 43. Free ends 42 and 43 are contoured with outwardly diverging bearing surfaces which, as shall be explained, assist in accurately aligning blocks 37. Coupled to block 37 and extending centrally between the arms is a lug 44 whose outer end 45 terminates farther away from block 37 than the arm free ends 42 and 43. Lug 44 is formed on one side with a pair of convexly rounded abutment shoulders, only one shoulder 46 of which is shown in FIG. 2.

Extending transversely through lug 44 and perpendicular to the lug longitudinal centerline is an opening 48 for holding a retaining pin 49. As shall be more fully explained in conjunction with FIGS. 3 and 4 retaining pin 49 coacts with a locking pin 50 that is positioned generally within lug 44 and aligned obliquely across lug longitudinal centerline 47.

Force-transmitting means in the form of a socket-headed capscrew 51 is interengaged with a threaded cavity 52 of block 37 and is aligned coaxially with locking pin 50. Tightening means in the form of another socket-headed capscrew 53 is interengaged with a threaded cavity 54 in the outer or rearward end 55 of block 37. Screw 53 bridges a gap 56 formed by a pair of split sections 57 and 58. The gap 56 opens inwardly to a retaining opening dimensioned to receive and tightly hold lower collar 33 of dial indicator 25. To load dial indicator 25 into clamping mechanism 24 screw 53 is loosened by a conventional crank or key, lower collar 33 is inserted into now-enlarged retaining opening 59 and, when dial indicator 25 is swiveled to the desired visual orientation, screw 53 is firmly tightened.

Clamping mechanism 24 coacts with a body 60 which may be quill stop ring (such as ring 19 shown in FIG. 1) or any other type of body formed with a bore 61. As indicated in FIG. 2 body 60 has an external curved periphery portion 62 and an interior wall 63 that defines bore 61. Bore 61 extends generally normally to the curved periphery portion 62 and is larger than lug 44 so that lug 44 can be inserted into bore 61. The important manner by which clamping mechanism 24 is secured to and aligned with body 60 shall be described in connection with FIGS. 3, 4 and 5.

Base support 29 is positioned beneath and vertically spaced from clamping mechanism 24 and has a relatively thick plate 64 with top and bottom surfaces 65 and 66. Plate 64 is formed through its central section with a retaining opening 67 and along its front or inner edge with a recess 68. Depending from the undersurface of plate 64 is a pair of laterally spaced struts 69 and 70 formed on their lower ends with a pair of forwardly extending projections 71 and 72. The struts 69 and 70 are sufficiently long to span the thickness of the stationary lower support rib boss 30 formed by the quill housing (as shown in phantom lines). To assemble base support 29 firmly on support boss 30 the base support 29 is held against boss 30 with the micrometer screw 21 positioned partially within recess 68. Mounting screw 73 and 74 are then tightened upwardly through projections and against the underside of boss 30.

A setscrew 75 or knob is mounted in plate 64 to bear against measuring rod 26 when it is inserted within retaining opening 67. The elongated measuring rod 26 is shown carrying a pair of stop rings 27 and 28 with setscrews 76 and 77 but ordinarily rod 26 would mount one stop ring. Two stop rings would ordinarily be used when the machinist or workman planned to make frequent cuts into workpiece at two fixed depths. For example, to prepare for milling or otherwise cutting the workpiece to a relatively great depth stop ring 27 would be slid downwardly into flush engagement with the top surface 65 of thick plate 64 and then knob 75 would be tightened. Thereafter to mill or cut the same workpiece to a given shallower depth knob 75 would be loosened, and measuring rod 26 would be raised until stop ring 28 was placed in flush engagement with the lower flat surface 66 of the plate 64.

Referring now to FIGS. 3 and 4 clamping mechanism 24 is shown firmly clamped to and perfectly aligned with a body illustrated, in this situation, as a quill stop ring 19 such as the one indicated in FIG. 1. The body 19 has a cylindrical exterior periphery 78 and a cylindrical bore 79 is formed through annular wall 80. Locking pin 50 has an inner end 81, an outer end 82, and a notch 83 formed through an intermediate peripheral portion between inner end 81 and outer end 82. Inner end 81 is slightly convexed to form a pressure transfer point for engagement with the inner end of socket-headed capscrew 51. The outer end 82 of locking pin 50 is curved to match and make flush engagement with the interior bore wall 79. In this situation locking pin outer end 82 would be of cylindrical configuration and preferably of complementary contouring relative to the particular contouring of the interior bore wall 79. LOcking pin 50 is free to travel along its own axis and is prevented from falling away from the lug and becoming misplaced by retaining pin 49. If for example, clamping mechanism 24 were disengaged and locking pin 49 were tilted downwardly then it would be prevented from falling out of place because the inner notch 83 would serve as a stop upon contacting retaining pin 49.

The outwardly diverging bearing surfaces formed on arm free ends 42 and 43 assist in properly aligning body 19 and clamping mechanism 24. Retaining opening 59 and the bearing surfaces are preferably aligned perpendicular to block top surface 38 so that at least one bearing surface can be employed to align retaining opening 59 in perfect registration with the base supporting retaining opening 67 shown in FIG. 2. If retaining opening 59 were skewed or slanted relative to measuring rod 26 then readings from dial indicator 25 would tend to become inaccurate.

To assemble clamping mechanism 24 on body 19 the mechanic projects lug 44 into bore 79 and holds arm free end 42 gently against the body outer periphery 78. When socket-headed capscrew 51 is rotated inwardly it transfers force coaxially to locking pin 50 and thrusts it against the bore interior wall 79. As locking pin 50 is thrust from a retracted to an extended position its curved outer end 82 makes flush, or at least line contact, engagement with the bore wall 79. Continued twisting of screw 51 forces lug 44 to shift laterally away from locking pin outer end 82 until the two abutment shoulders 46 and 84 engage, in line contact, different locations of the bore wall 79. When the locking pin outer end 82 and abutment shoulders 46 and 84 are firmly clamped against the bore wall 79 by a three-point contact, which is very stable then, the retaining opening 59 will be accurately aligned for insertion of dial indicator 25. It should be noted that a gap 85 may exist between the body outer periphery 78 and free end 43 but this will not impair the desired alignment since only one free end is required to be engaged with periphery 78 for perfect alignment. The only arm necessary for alignment purposes is the arm 40 corresponding with the side of lug 44 from which the locking pin 50 may be projected.

FIG. 4 shows that when the ultimate clamping force is effected a gap 86 exists between the lug side 87 through which locking pin 50 projects and the adjacent or corresponding periphery of bore wall 79.

If accurate alignment became unnecessary or it became desirable to hold an item in retaining opening 59 at a slanted angle then the machinist would merely be required to slightly withdraw the clamping mechanism 24 from bore 79. He could then swivel or tilt clamping mechanism 24 to the desired angular position and fully enjoy most of the benefits of the clamping mechanism 24.

FIG. 5 is a side view of clamping mechanism 24 taken along line 5—5 of FIG. 3 with the body 19 removed and a forward portion of arm 40 removed. The outer end 82 of locking pin 50 projects outwardly from the lug 44 for a sufficient distance to accomplish the necessary clamping action.

OPERATION

Keeping the above construction in mind the various advantages of the clamping mechanism can now be understood.

Assuming that clamping mechanism 24 is to be employed in order to assist in measuring machine quill travel (which is only one of may possible uses) then, referring to FIG. 3, the machinist makes sure that locking pin 50 is initially shoved to a retracted position so lug 44 can be easily inserted into bore 79. As the machinist torques or rotates screw 51, he gently thrusts block 37 forwardly so arm 40 is held in flush engagement against the external periphery 78 of the body 19. Eventually the curved leading or external end 82 makes flush or at least line engagement against the bore wall 79. As screw 51 is additionally torqued the two abutment walls 46 and 84 formed by lug 44 are driven tightly against two different bore wall locations are shown in FIG. 4. When the three-point clamping engagement is established by locking pin 50 and abutment walls 46 and 84 the lug wall 87 near locking pin 50 will be separated from the adjacent bore wall by a gap 86. In addition arm 39 may also be separated by a gap 85 from the adjacent wall.

Dial indicator 25 is inserted into retaining opening 59 and is tightening in place by screw 53. The base support 29 is held against the lower portion boss 30 with the quill housing recess 68 partially surrounding the micrometer screw 21. Vertically extending screws 74 and 73 are tightened upwardly against the undersurface of boss 30. Measuring rod 26 is slid into retaining opening 59 and stop rings 27 and 28 are fixed at predetermined locations from the ends of measuring rod 26. It will be appreciated that only one stop ring need be used although when two are employed then the machinist is able to save time when a workpiece is to be cut at two frequently repeated depths. When a stop ring 27 is resting on top surface 65 of support base 29 than one cutting depth is established. When the lower stop ring 28 is positioned against the flat lower face 66 and setscrew 75 is tightened then the other predetermined cutting depth is established.

Referring to FIG. 1, when stop ring 28 is tightened in place against base 29 the dial indicator 25 may be lowered by quill feed handle 16 until the dial indicator 25 is displaying a zero reading. Thereafter, the machinist may commence to lower quill unit 13 by handle 16 and simultaneously visually measure the cutting tool penetration by observing dial indicator 25.

It should be understood that measuring rods of different predetermined lengths may be used with one or two stop rings or, alternatively, no stop rings at all. The distances from a rod end may, of course, be measured by gauge blocks from base 29. The machinist may be further assisted by dimensioning the thicknesses of a stop ring and base support plate 64 so that their combined thicknesses total a convenient predetermined thickness such as 1.000 inch for example. This handy and easily established thickness may be used from time to time in preference to using gauge blocks. The range of dial indicator 25 is thus effectively extended.

In addition clamping mechanism 24 may clamp a second measuring rod instead the dial indicator 25 so that when the top measuring rod is lowered into engagement with lower measuring rod 26 movement of quill unit 13 can be stopped by the machinist at a predetermined cutting depth after a "pressure-feel" is imparted to the machinist.

From the various foregoing it will be evident that the present invention has provided a clamping mechanism in which all of the various advantages are fully realized.

What is claimed is:

1. A clamping mechanism comprising:
   a. a block;
   b. a lug with a longitudinal centerline coupled to the block;
   c. an abutment shoulder on the lug;
   d. a locking pin with an inner end and an outer end positioned in the lug and aligned obliquely across the lug longitudinal centerline, the pin being arranged for movement between a retracted position and an extended position partially outside of the lug a longitudinally extending notch formed in an intermediate wall portion of the locking pin between its inner and outer ends;
   e. a retaining pin associated with the lug and positioned in the notch to limit travel by the pin;
   f. force-transmitting means coupled to the block for urging the locking pin to move with respect to the lug; and
   g. an arm extending from the block in the same general direction as the lug, the arm being arranged for use in positioning the block.

2. The structure according to claim 1, wherein;
   the force-transmitting means is a screw that engages and is coaxially aligned with the locking pin.

3. The structure according to claim 1, including:
   a second arm extending from the block and spaced from the first arm, said arms positioned on opposite sides of the lug, the arms terminating in free ends arranged to assist in aligning the block.

4. The structure according to claim 1, including:
   a body having a curved exterior periphery and an interior wall defining a bore that extends generally normally to the curved exterior periphery,
   wherein the lug projects into the bore with the locking pin outer end and abutment shoulder locked against different interior wall locations and at least one arm is positioned in engagement with the curved exterior periphery.

5. The structure according to claim 4, wherein:
   the locking pin outer end is curved to match and make substantially flush engagement with the interior wall.

6. The structure according to claim 4, wherein;
   the angle between the lug longitudinal center line and locking pin is between 40° and 70°.

7. The structure according to claim 6, wherein;
   the arm free ends are formed with outwardly diverging bearing surfaces, at least one bearing surface of which engages the body curved exterior periphery to mutually align the block and body.

8. The structure according to claim 7, wherein;
   two abutment shoulders are provided in the lug and arranged so that when the locking pin is urged to engage the interior wall at one location the two abutment shoulders are forced to engage the interior wall at two other locations in order to effect a stable three-point clamping engagement with the body.

9. The structure according to claim 7, including:
   a retaining opening formed through the block and;

tightening means coupled to the block for selectively diminishing or enlarging the retaining opening.

10. The structure according to claim 7, including:
a dial indicator inserted in the retaining opening and held by the block.